United States Patent
Rowell et al.

(10) Patent No.: US 10,374,731 B2
(45) Date of Patent: Aug. 6, 2019

(54) OVER-THE-AIR MEASUREMENTS SYSTEM AS WELL AS METHOD FOR TESTING THE OVER-THE-AIR CHARACTERISTICS OF A DEVICE UNDER TEST

(71) Applicant: Rohde & Schwarz GmbH & Co. KG, Munich (DE)

(72) Inventors: Corbett Rowell, Munich (DE); Vincent Abadie, Hohenschaeftlarn (DE); Daniel Markert, Deggendorf (DE); Adam Tankielun, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/799,413

(22) Filed: Oct. 31, 2017

(65) Prior Publication Data
US 2019/0132064 A1    May 2, 2019

(51) Int. Cl.
*H04B 17/29* (2015.01)
*H04B 17/15* (2015.01)
*H04B 7/06* (2006.01)

(52) U.S. Cl.
CPC .......... *H04B 17/29* (2015.01); *H04B 17/15* (2015.01); *H04B 7/0613* (2013.01)

(58) Field of Classification Search
CPC ................................................... H04B 17/29
USPC ............................................................ 375/224
See application file for complete search history.

(56) References Cited

U.S. PATENT DOCUMENTS

| | | | |
|---|---|---|---|
| 6,064,326 A * | 5/2000 | Krone | H03M 3/362 341/118 |
| 6,801,788 B1 | 10/2004 | Csapo et al. | |
| 9,319,908 B2 * | 4/2016 | Nickel | G01R 29/10 |
| 2013/0002509 A1 * | 1/2013 | Liu | H01Q 15/0086 343/860 |
| 2014/0029431 A1 * | 1/2014 | Haberland | H04W 88/08 370/235 |
| 2014/0181576 A1 * | 6/2014 | Chahal | G06F 9/45533 714/6.13 |
| 2014/0245879 A1 * | 9/2014 | Bock | F42B 33/06 86/50 |
| 2015/0195075 A1 * | 7/2015 | Gorokhov | H04L 1/0026 370/330 |
| 2015/0244400 A1 * | 8/2015 | Mueck | H04B 1/0057 455/77 |
| 2015/0373730 A1 * | 12/2015 | Fujishiro | H04L 1/0003 455/450 |

* cited by examiner

*Primary Examiner* — Lihong Yu
(74) *Attorney, Agent, or Firm* — Christensen O'Connor Johnson Kindness PLLC

(57) ABSTRACT

An over-the-air measurement system for testing the over-the-air characteristics of a device under test is described, comprising several antenna units for receiving and transmitting radio frequency signals, several remote radio units that convert radio frequency signals into digital signals or vice versa, and a baseband unit for generating and analyzing baseband signals. The baseband unit is connected to the remote radio units, the baseband unit having at least one physical layer control unit that is configured to adapt the over-the-air measurement system with regard to the physical layer. The several antenna units are connected to the remote radio units. Further, a method for testing the over-the-air characteristics of a device under test is described.

14 Claims, 1 Drawing Sheet

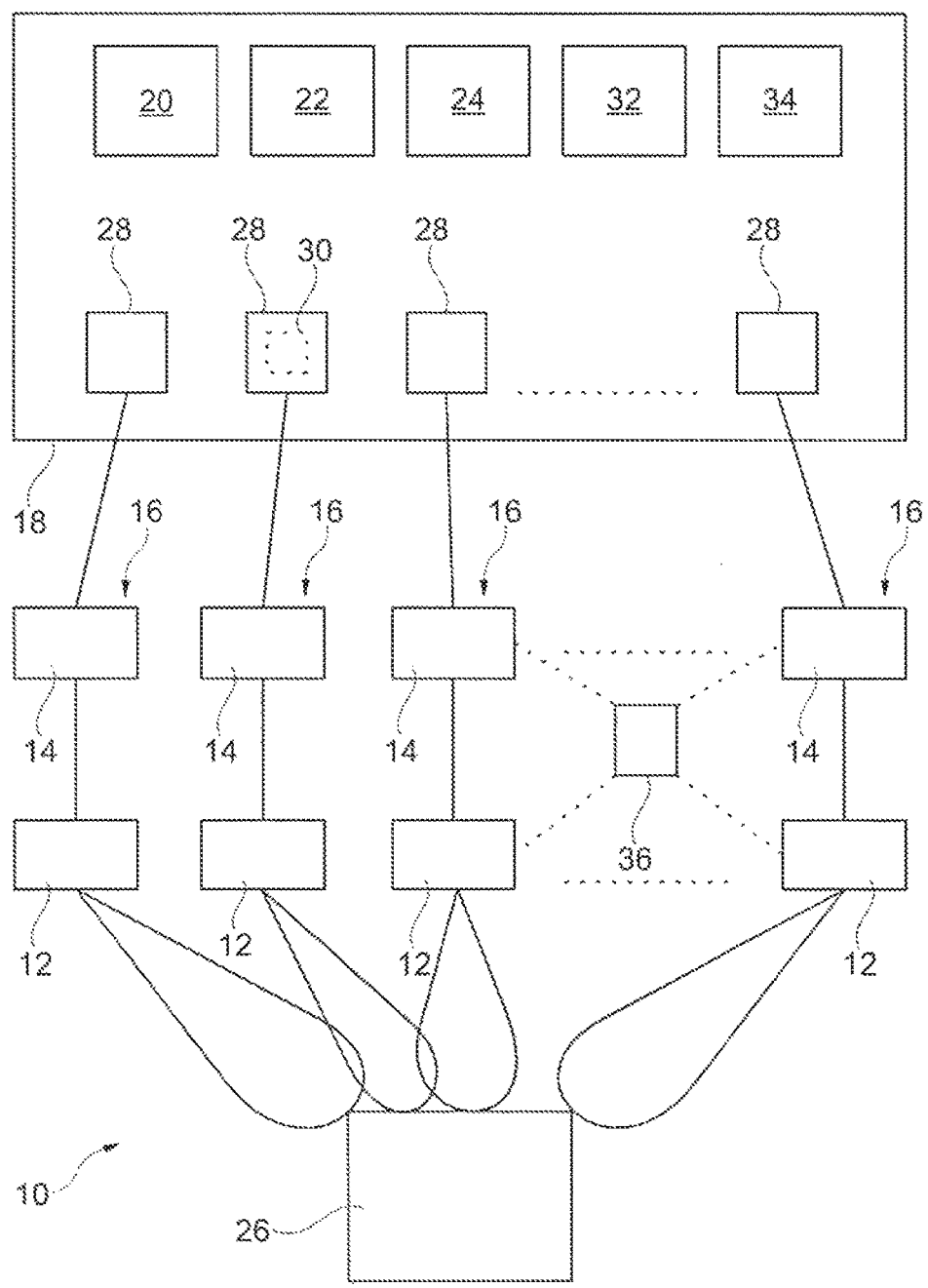

OVER-THE-AIR MEASUREMENTS SYSTEM AS WELL AS METHOD FOR TESTING THE OVER-THE-AIR CHARACTERISTICS OF A DEVICE UNDER TEST

TECHNICAL FIELD

Embodiments of the present disclosure relate to an over-the-air measurement system for testing the over-the-air characteristics of a device under test. Further, embodiments of the present disclosure relate to a method for testing the over-the-air characteristics of a device under test.

BACKGROUND

In the state of the art, over-the-air measurement systems are known which are used to characterize the over-the-air characteristics of a device under test such as a user equipment (UE) or a customer premises equipment (CPE), for instance a mobile phone, a smartphone or a tablet. Usually, the over-the-air measurement systems used may perform test measurements for characterizing certain properties of the device under test with regard to a certain telecommunication standard, for instance a Long Term Evolution (LTE) standard, 5G also called Next Generation Mobile Networks (NGMN), Global System for Mobile Communication (GSM), Wireless Local Area Network (WLAN) and so on. These different telecommunication standards are typically measured by testing the receiving and/or transmitting properties of the device under test with regard to the dedicated telecommunication standard.

However, it is complicated to perform coordinated multi-point measurements by using the over-the-air measurement systems known in the prior art in order to simulate several distributed base stations transmitting signals of the same telecommunication standard.

Accordingly, there is a need for an over-the-air measurement system as well as a method for testing the over-the-air characteristics of a device under test enabling distributed base station test measurements of a device under test.

SUMMARY

Embodiments of the present disclosure provide an over-the-air measurement system for testing the over-the-air characteristics of a device under test, comprising:
several antenna units for receiving and transmitting radio frequency signals;
several remote radio units that convert radio frequency signals into digital signals or vice versa;
a baseband unit for generating and analyzing baseband signals,
wherein the baseband unit is connected to the remote radio units, the baseband unit having at least one physical layer control unit that is configured to adapt the over-the-air measurement system with regard to the physical layer, and
wherein the several antenna units are connected to the remote radio units.

Accordingly, an over-the-air measurement system is provided that has several active antenna systems (AAS) which each comprise one antenna unit as well as one remote radio unit. As several active antenna systems, namely several antenna units and several remote radio units, are provided, several base stations can be emulated simultaneously by controlling the antenna units and the remote radio units as well as the baseband unit appropriately. Hence, accurate measurements of the network radio properties of the device under test can be obtained. Therefore, a very flexible over-the-air measurement system for testing the over-the-air characteristics of a device under test is provided that enables to measure a wider range of the device under test with regard to the radio frequency telecommunication standards and/or the related protocols. Accordingly, the scalability of the measurement system is improved.

The baseband unit may generate certain baseband signals that are processed by the remote radio units and the antenna units or it may analyze baseband signals within the signals processed by the antenna units and the remote radio units.

The active antenna systems are connected to the baseband unit that is configured to adapt the over-the-air measurement system with regard to the physical layer of the telecommunication standard to be tested. Hence, test measurements for different telecommunication standards can be carried out while adapting the physical layer of the measurement system appropriately via the at least one physical layer control unit.

The physical layer is defined in the open systems interconnection model (OSI model), wherein the physical layer interfaces the physical medium with the medium access control layer (MAC layer) and further upper layers according to the OSI model. The physical layer is also known as PHY layer or layer 1 of the OSI model. In general, the physical layer converts the MAC layer format in a suitable manner to ensure proper transmission over the respective medium, for instance via an appropriate wireless channel for testing the over-the-air characteristics of the device under test. Moreover, the physical layer provides (de-) modulation of the respective signal to incorporate the respective functionalities. Further, forward error correction (FEC) functionality will be added by the physical layer enabling error correction at the respective receiver. However, the physical layer applied depends on the telecommunication standard used as different physical layers (as well as the corresponding telecommunication standards) have different modulation formats and forward error correction (FEC) configurations. Accordingly, the physical layer will be adapted by the physical layer control unit depending on the telecommunication standard to be tested provided that different telecommunication standards shall be tested. For instance, the physical layer control unit adapts the over-the-air measurement system with regard to the physical layer such that a GSM physical layer is applied in case that the GSM telecommunication standard has to be tested.

The antenna units used for transmitting and/or receiving the radio frequency signals correspond to beam forming units which can be controlled appropriately in order to ensure beam steering properties of the antenna units. Thus, the main lobe or the respective radiation pattern of the antenna unit can be steered appropriately for testing the device under test in a desired manner, for instance testing handover scenarios between different base stations and/or multi-point communications with different base stations.

According to an aspect, at least the several antenna units are controlled by the baseband unit. Thus, the radio frequency signal(s) transmitted via the antenna units can be controlled depending on the telecommunication standard to be tested, in particular the appropriate directions of the radiation patterns of the different antenna units.

According to another aspect, the baseband unit has at least one medium access control layer control unit that is configured to adapt the over-the-air measurement system with regard to the medium access control layer. The medium access control layer (MAC layer) interfaces the physical layer and upper layers according to the OSI model such as network layers. The MAC layer also depends on the telecommunication standard to be tested such that it can be adapted by the medium access control layer control unit in an appropriate manner when testing different telecommunication standards.

Moreover, the baseband unit has a radio synchronization control unit for synchronizing the several remote radio units. The radio synchronization control unit is used for radio synchronization, in particular for radio synchronization of the different remote radio units. The radio synchronization control unit ensures that several active antenna systems may be used in a synchronized manner in order to emulate several base stations which may transmit data to the device under test in a synchronized manner. The independent time shared wireless telecommunications systems (different base stations simulated) can be operated in an appropriate manner for the testing of the device under test. Particularly, coordinated multi-point test measurements can be performed for testing the respective properties of the device under test.

Further, the baseband unit may comprise at least one virtual machine. The virtual machine is configured to emulate at least one system wherein it provides the functionality of such a physical system. In other words, the at least one virtual machine can provide a substitute for a real machine as it provides the required functionality.

In some embodiments, the baseband unit comprises several virtual machines, one virtual machine being assigned to one dedicated remote radio unit such that each remote radio unit is assigned to its own virtual machine. Thus, the different active antenna systems, in particular the remote radio units as well as the antenna units connected thereto, may be used to simulate a certain system being different with regard to the other active antenna systems. The different systems emulated by the different virtual machines may correspond to different telecommunication standards, for instance 5G, WLAN, GSM, or LTE.

Further, the several virtual machines may be configured to provide signals for at least one of different carrier aggregations, different carrier interferences, separate systems and combinations thereof. Thus, all situations can be simulated which might occur in the reality in order to ensure that the device under test can be tested under real conditions. The separate systems relate to systems using different telecommunication standards such that signals of different telecommunication standards, for instance Long Term Evolution (LTE), 5G, GSM, and/or WLAN, can be tested simultaneously.

The several virtual machines may be configured to provide different signals simulating different base stations. The different base stations ensure that coordinated multi-point measurements can be performed such that the device under test receives data from several base stations simulated. These different base stations may correspond to the same system (same telecommunication standard) or to different systems such that different telecommunication standards can be tested simultaneously.

In other words, the over-the-air measurement system may operate different wireless communication protocols simultaneously.

Further, the at least one virtual machine may comprise a fading unit. Thus, the signal provided can be faded, for instance in order to simulate a movement of the device under test with respect to the respective base station by controlling the fading unit of that virtual machine in an appropriate manner.

The baseband unit may comprise at least one of a load balance unit and a scheduler unit. The different signals to be applied can be scheduled in an appropriate manner by the scheduler unit. Further, the load to be transmitted via the signal(s) can be balanced by using the load balance unit that controls the different active antenna systems appropriately in order to distribute the load appropriately.

According to another aspect, the antenna units are established by at least one of antenna arrays and single high-gain antennas. Thus, different antennas can be used for transmitting and/or receiving the radio frequency signals. The individual antenna elements of the antenna array can be controlled in order to perform the beam steering. The single high-gain antennas may be pivoted in order to adjust the direction of the respective radiation pattern.

For instance, the antenna arrays are plane wave converters. This ensures that the far field characteristics of the device under test can be tested in the near field of the device under test in an appropriate manner.

Furthermore, at least one local oscillator clock may be provided that is assigned to at least one of the remote radio units and the antenna units. Thus, a single local oscillator clock can be used for all remote radio units. Alternatively or supplementarily, a single local oscillator clock can be used for all antenna units.

For instance, the at least one local oscillator clock assigned to at least one of the remote radio units is synchronized with the at least one local oscillator clock assigned to at least one of the antenna units. Thus, the remote radio units as well as the antenna units may have their own local oscillator clock wherein these at least two different local oscillator clocks are synchronized with each other. Alternatively, the local oscillator clocks are not synchronized wherein they are controlled appropriately.

In an alternative embodiment, the at least one local oscillator clock may be assigned to the antenna units and the remote radio units. Thus, a single local oscillator clock may be provided for all antenna units and all remote radio units simultaneously such that the whole measurement system comprises only one local oscillator clock.

At least one of each of the remote radio units and each of the antenna units is assigned to its own certain local oscillator clock, the local oscillator clocks being synchronized with each other. Thus, each of the remote radio units has its own local oscillator clock wherein these local oscillator clocks are synchronized with each other. In a similar manner, each of the antenna units has its own local oscillator clock wherein these local oscillator clocks are synchronized with each other.

In general, the local oscillator clock(s) provide(s) a stable reference time for the different active antenna systems. In case of several local oscillator clocks the stable reference time is ensured due to the synchronization.

According to another aspect, the antenna units are located in the near field of the device under test. Thus, the far field characteristics of the device under test are measured even though the antenna units are located in the near field of the device under test.

For instance, the over-the-air measurement system comprises an interference-limited environment such as an antenna test chamber. The device under test is located in this interference-limited environment. At least the antenna units are assigned to the interference-limited environment. Hence, no disturbing interferences occur which might impair the testing.

Further, embodiments of the present disclosure provide a method for testing the over-the-air characteristics of a device under test by using an over-the-air measurement system for testing the over-the-air characteristics of a device under test, with several antenna units for receiving and transmitting radio frequency signals, several remote radio units that convert radio frequency signals into digital signals or vice versa, the remote radio units being connected to the several antenna units, a baseband unit for generating and analyzing baseband signals, the baseband unit being connected to the remote radio units, the baseband unit having at least one physical layer control unit that is configured to adapt the over-the-air measurement system with regard to the physical layer, wherein multiple beams are directed towards the device under test via the several antenna units such that a coordinated multi-point measurement is performed.

The device under test can be tested with regard to its behavior when receiving different signals from different base stations. Several base stations are emulated by the measurement system in order to carry out coordinated multi-point measurements of the device under test.

Moreover, uplink and/or downlink MIMO (multiple in multiple out) measurements can be performed appropriately by using the measurement system mentioned above.

According to an aspect, the measurement is performed by a dedicated number of remote radio units. Hence, at least one remote radio unit is in its operating state during the measurement. However, a number of remote radio units may be set appropriately, for instance N−1 of N remote radio units. In fact, one to N of N remote radio units may be used depending on the test scenario to be applied. In other words, each subset of the remote radio units available can be used for the testing.

According to another aspect, the several antenna units, the several remote radio units and the baseband unit are controlled such that different telecommunication standards are tested simultaneously. Thus, the different base stations simulated may correspond to different telecommunication standards to be tested in an appropriate manner.

Further, the several antenna units can be used for jamming purposes.

Generally, the several antenna units are connected to the remote radio units such that each antenna unit is assigned to its respective remote radio unit.

Further, the remote radio units are configured to convert the radio frequency signals into digital signals wherein these digital signals are in-phase/quadrature signals (I/Q signals).

As the active antenna systems are connected to the same baseband unit, the baseband unit is a centralized baseband unit.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein The FIGURE shows a schematic overview of an exemplary embodiment of an over-the-air measurement system according to the present disclosure that can be used to perform an embodiment of a method for testing the over-the-air characteristics of a device under test according to the present disclosure.

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In FIG. 1, an over-the-air measurement system 10 is shown that comprises several antenna units 12 for receiving and transmitting radio frequency signals as well as several remote radio units 14 that convert radio frequency signals into digital signals or vice versa. In the shown embodiment, only four of N antenna units 12 and remote radio units 14 are shown respectively for the sake of clarity. The several antenna units 12 and the several remote radio units 14 are connected to each other wherein each antenna unit 12 is assigned to a dedicated remote radio unit 14. Hence, each couple of antenna unit 12 and remote radio unit 14 establish an active antenna system 16.

The several active antenna systems 16, in particular the remote radio units 14, are each connected to a baseband unit 18 that is configured to generate and analyze baseband signals. The baseband unit 18 is connected to the remote radio units 14 such that digital signals are forwarded to the remote radio units 14 that are converted into radio frequency signals to be transmitted via the respective antenna units 12. In a similar manner, the radio frequency signals received via the antenna units 12 are converted by the remote radio units 14 such that digital signals are forwarded to the baseband unit 18 for analyzing purposes.

The baseband unit 18 comprises a physical layer control unit 20 that is configured to adapt the over-the-air measurement system 10 with regard to the physical layer (PHY layer) as will be described later. The baseband unit 18 also comprises a medium access control layer control unit 22 that is configured to adapt the over-the-air measurement system 10 with regard to the medium access control layer (MAC layer) as will also be described later.

Further, the baseband unit 18 that is connected to all remote radio units 14 such that the baseband unit 18 is a centralized baseband unit for the active antenna systems 16. The baseband unit 18 has a radio synchronization control unit 24 that is configured to synchronize the several remote radio units 14 connected to the baseband unit 18 such that the signals transmitted via the active antenna systems 16 can be processed in a synchronized manner. Hence, the radio synchronization control unit 24 is used for radio synchronization, in particular for radio synchronization of the different remote radio units 14.

The radio synchronization control unit 24 ensures that several active antenna systems 16 may be used in a synchronized manner in order to emulate several base stations which may transmit data to a device under test 26 in a synchronized manner. Accordingly, the active antenna systems 16, in particular the remote radio units 14, act as base stations. The several base stations simulated correspond to independent time shared wireless telecommunications systems like base stations which can be operated in an appropriate manner for the testing of the device under test 26. Particularly, coordinated multi-point test measurements can be performed for testing the respective properties of the device under test 26.

Therefore, the baseband unit 18 is also configured to control the several antenna units 12 of the active antenna systems 16 wherein the baseband unit 18 may control the beams of the antenna units 12, for example their radiation patterns, such that beam steering properties are ensured. Accordingly, the antenna units 12 correspond to beam forming units as their respective radiation patterns, in particular the directions of the main lobes, can be set appropriately.

The antenna units 12 may be established by antenna arrays. Hence, the baseband unit 18 may control the individual antenna elements of the antenna arrays for beam steering purposes. For instance, the antenna arrays are plane wave converters which ensure that the far field characteristics of the device under test 26 can be tested in the near field. Therefore, the over-the-air measurement system 10 may comprise an interference-limited environment, for instance an antenna test chamber. At least the device under test 26 and the antenna units 12 may be assigned to the respective environment for testing purposes.

Alternatively, the antenna units 12 may be provided by single high-gain antennas which can be controlled in an appropriate manner in order to ensure the beam forming characteristics of the antenna units 12. For instance, the single high-gain antennas are pivoted in a controlled manner wherein the baseband unit 18 provides the appropriate control signals.

As shown in FIG. 1, the baseband unit 18 comprises several virtual machines 28 that are assigned to dedicated remote radio units 14 which means that each remote radio unit 14 is assigned to a certain virtual machine 28. In other words, each active antenna system 16, in particular each remote radio unit 14, is assigned to its own virtual machine 28. Thus, each active antenna system 16 can be used for simulating a base station such that several base stations can be emulated simultaneously. As the virtual machine 28 is generally configured to simulate different telecommunication standards, separate systems and their influence on the device under test 26 can be measured simultaneously.

In order to ensure the testing of different telecommunication standards, the baseband unit 18 comprises the at least one physical layer control unit 20 as well as the at least one medium access layer control unit 22 which adapt the appropriate settings of the measurement system 10 appropriately in order to ensure that the different telecommunication standards can be tested.

This means that the settings of the measurement system 10 will be adapted to the telecommunication standard with regard to the physical layer wherein the at least one physical layer control unit 20 is used in an appropriate manner. For instance, the at least one physical layer control unit 20 adapts the over-the-air measurement system 10 with regard to the physical layer such that a GSM physical layer is applied in case that the GSM telecommunication standard shall be tested. Alternatively, the at least one physical layer control unit 20 adapts the over-the-air measurement system 10 with regard to the physical layer such that a LTE physical layer is applied provided that the LTE telecommunication standard shall be tested.

The same applies for the medium access layer control unit 22.

In general, the over-the-air measurement system 10, in particular the several virtual machines 28, is configured to provide signals for different carrier aggregations, different carrier interferences and separate systems as well as combinations thereof. As mentioned above, the separate systems correspond to different telecommunication standards. Hence, signals of different base stations can be superposed such that carrier interferences and/or carrier aggregations are tested wherein the signals superposed correspond to the same telecommunication standard. Further, the signals superposed may correspond to different telecommunication standards.

Generally, the device under test 26 receives the appropriate signals of the several active antenna systems 16, for example the signals transmitted via the antenna units 12, which are converted by the remote radio units 14 and generated by the baseband unit 18.

In a similar manner, the device under test 26 may transmit signals corresponding to different telecommunication standards wherein these signals relating to the different telecommunication standards are received by the appropriate active antenna systems 16. The signals received are processed by the remote radio units 14, in particular digitized, and analyzed by the baseband unit 18 in an appropriate manner.

Moreover at least one of the several virtual machines 28 comprises a fading unit 30 such that the respective signal provided can be faded. This fading may relate to a movement of the device under test 26 between different base stations simulated by the over-the-air measurement system 10. Even though only one of the several virtual machines 28 has a fading unit 30 in the shown embodiment, each of the several virtual machines 28 may comprise its own fading unit 30.

Furthermore, the baseband unit 18 may also comprise at least one load balance unit 32 as well as a scheduler unit 34 in order to balance the load to be transmitted via the active antenna systems 16 and to schedule the signal transmission(s) appropriately.

In addition, the measurement system 10 comprises at least one local oscillator clock 36 as shown in FIG. 1. The local oscillator clock 36 is assigned to each of the remote radio units 14 as well as each of the antenna units 12. However, for the sake of clarity, the appropriate connections are only shown for two remote radio units 14 as well as two antenna units 12.

Alternatively, the remote radio units 14 and the antenna units 12 may comprise their own local oscillator clock respectively wherein both local oscillator clocks may be synchronized with respect to each other. Alternatively, the separate local oscillator clocks may be not synchronized wherein they are controlled appropriately.

According to another embodiment, each of the remote radio units 14 and/or each of the antenna units 12 may have its own local oscillator clock. The respective local oscillator clocks assigned to the remote radio units 14 are synchronized with respect to each other. In a similar manner, the respective local oscillator clocks assigned to the antenna units 12 may be synchronized with respect to each other. In addition, all local oscillator clocks can be synchronized with respect to each other.

In general, the local oscillator clock 36 provides a stable reference time for the different active antenna systems 16.

As already described, the over-the-air measurement system 10 shown in FIG. 1 can be used for testing the over-the-air characteristics of the device under test 26 wherein the far field characteristics of the device under test 26 can be tested in the near field appropriately.

The several antenna units 12 as well as the several remote radio units 14 are controlled such that different base stations are simulated, for example different base stations of separate systems with regard to the telecommunication standard. Generally, the several antenna units 12 as well as the several remote radio units 14 can be controlled via the baseband unit 18 such that multiple beams are directed towards the device under test 26 as shown in FIG. 1. Accordingly, a coordinated multi-point measurement may be performed. For instance, the device under test 26 receives data from several different base stations simulated by the active antenna systems 16 wherein these different base stations correspond to separate systems with regard to the telecommunication standard.

During the testing of the device under test 26, a certain number of the active antenna systems 16 may be used such that only a subset of the several remote radio units 14 being available have to be used during the measurements.

The control units 20, 22, and 24 may include, in some embodiments, logic for implementing the technologies and methodologies described herein. This logic of the control units 20, 22, and 24 can be carried out in either hardware or software, or a combination of hardware and software. In some embodiments, the control units 20, 22, and 24 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the control units 20, 22, and 24 includes a microprocessor and a memory storing logic modules and/or processor implemented instructions. In an embodiment, the control unit 20 includes one or more ASICs having a plurality of predefined logic components. In an embodiment, the control units 20, 22, and 24 includes one or more FPGA having a plurality of programmable logic components. In an embodiment, the control units 20, 22, and 24 includes hardware circuit implementations (e.g., implementations in analog circuitry, implementations in digital circuitry, and the like, and combinations thereof). In an embodiment, the control units 20, 22, and 24 includes combinations of circuits and computer program products having software or firmware instructions stored on one or more computer readable memories that work together to cause a device to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An over-the-air measurement system for testing the over-the-air characteristics of a device under test, comprising:
    several antenna units for receiving and transmitting radio frequency signals;
    several remote radio units that convert radio frequency signals into digital signals or vice versa, wherein said several antenna units are connected to said remote radio units;
    a baseband unit for generating and analyzing baseband signals, said baseband unit connected to said remote radio units and comprising several virtual machines, one virtual machine being assigned to one dedicated remote radio unit such that each remote radio unit is assigned to its own virtual machine, said baseband unit having at least one physical layer control unit that is configured to adapt said over-the-air measurement system with regard to the physical layer; and
    wherein said several antenna units correspond to beam forming units ensuring beam steering properties of said antenna units so that the main lobe or the respective radiation pattern of said antenna units can be steered appropriately for testing said device under test in a desired manner,
    wherein said several virtual machines are configured to provide different signals simulating different base stations.

2. The over-the-air measurement system according to claim 1, wherein at least said several antenna units are controlled by said baseband unit.

3. The over-the-air measurement system according to claim 1, wherein said baseband unit has at least one medium access control layer control unit that is configured to adapt said over-the-air measurement system with regard to the medium access control layer.

4. The over-the-air measurement system according to claim 1, wherein said baseband unit has a radio synchronization control unit for synchronizing said several remote radio units.

5. The over-the-air measurement system according to claim 1, wherein said several virtual machines are configured to provide signals for different carrier aggregations, different carrier interferences, separate systems or combinations thereof.

6. The over-the-air measurement system according to claim 1, wherein said at least one of said several virtual machines comprises a fading unit.

7. The over-the-air measurement system according to claim 1, wherein said baseband unit comprises at least one of a load balance unit and a scheduler unit.

8. The over-the-air measurement system according to claim 1, wherein said antenna units are established by antenna arrays or single high-gain antennas.

9. The over-the-air measurement system according to claim 8, wherein said antenna arrays are plane wave converters.

10. The over-the-air measurement system according to claim 1, wherein at least one local oscillator clock is provided that is assigned to at least one of said remote radio units and said antenna units.

11. The over-the-air measurement system according to claim 10, wherein said at least one local oscillator clock assigned to at least one of said remote radio units is synchronized with said at least one local oscillator clock assigned to at least one of said antenna units.

12. The over-the-air measurement system according to claim 10, wherein said at least one local oscillator clock is assigned to said antenna units and said remote radio units.

13. The over-the-air measurement system according to claim 10, wherein at least one of each of said remote radio units and each of said antenna units is assigned to its own local oscillator clock, said local oscillator clocks being synchronized with each other.

14. The over-the-air measurement system according to claim 1, wherein said antenna units are located in the near field of said device under test.

* * * * *